United States Patent
Akhtar et al.

(10) Patent No.: US 10,408,634 B2
(45) Date of Patent: Sep. 10, 2019

(54) NAVIGATION SYSTEM

(71) Applicant: Jaguar Land Rover Limited, Coventry (GB)

(72) Inventors: Naseem Akhtar, Coventry (GB); Brian Gerrard, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 143 days.

(21) Appl. No.: 15/128,777

(22) PCT Filed: Mar. 25, 2015

(86) PCT No.: PCT/EP2015/056369
§ 371 (c)(1),
(2) Date: Sep. 23, 2016

(87) PCT Pub. No.: WO2015/144751
PCT Pub. Date: Oct. 1, 2015

(65) Prior Publication Data
US 2018/0180439 A1    Jun. 28, 2018

(30) Foreign Application Priority Data

Mar. 25, 2014 (GB) .................................. 1405303.7
Mar. 25, 2014 (GB) .................................. 1405304.5

(51) Int. Cl.
*G01C 21/36* (2006.01)

(52) U.S. Cl.
CPC ....... *G01C 21/3641* (2013.01); *G01C 21/365* (2013.01); *G01C 21/367* (2013.01);
(Continued)

(58) Field of Classification Search
CPC ............ B60Q 2400/50; G01C 21/3632; G01C 21/365; G01C 21/3658; G01C 21/3661; G01C 21/3641
See application file for complete search history.

(56) References Cited

U.S. PATENT DOCUMENTS 6,198,386 B1 * 3/2001 White, II .................. B60R 1/00
                                                          33/264
6,873,898 B1 * 3/2005 Kostadina .............. B60K 28/16
                                                          340/539.28
(Continued)

FOREIGN PATENT DOCUMENTS

DE    102006048503 A1 *  4/2008    ............. B60Q 1/085
DE    102006050547 A1 *  4/2008
(Continued)

OTHER PUBLICATIONS

DeLorme Earthmate GPS PN-20 User Manual (Updated for 1.5 Firmware Release), 2008, 93 pages (Year: 2008).*
(Continued)

*Primary Examiner* — Behrang Badii
*Assistant Examiner* — David A Testardi
(74) *Attorney, Agent, or Firm* — Myers Bigel, P.A.

(57) ABSTRACT

A navigation system for providing navigation directions to a user comprising: an input for receiving user commands to define a navigation route; processing means arranged to determine navigation directions relating to the user selected route; an output arranged to output navigation directions to the user wherein the processing means is arranged to determine the boundary of the navigation route and the output is arranged to output an indication signal to mark the boundaries of the navigation route.

13 Claims, 7 Drawing Sheets

(52) U.S. Cl.
CPC ..... *G01C 21/3661* (2013.01); *G01C 21/3664* (2013.01); *B60Q 2400/50* (2013.01)

(56) References Cited

U.S. PATENT DOCUMENTS

| | | | |
|---|---|---|---|
| 6,977,630 B1 | 12/2005 | Donath et al. | |
| 2003/0146827 A1* | 8/2003 | Koike | B60Q 1/484 340/435 |
| 2003/0147247 A1* | 8/2003 | Koike | B60Q 1/484 362/464 |
| 2004/0066376 A1 | 4/2004 | Donath et al. | |
| 2006/0022811 A1* | 2/2006 | Haug | B60R 1/00 340/436 |
| 2006/0087416 A1* | 4/2006 | Kumabe | B60Q 1/50 340/435 |
| 2007/0013495 A1* | 1/2007 | Suzuki | B60W 50/14 340/435 |
| 2007/0139176 A1* | 6/2007 | Victor | B62D 15/029 340/435 |
| 2007/0210902 A1* | 9/2007 | Stewart | B60Q 1/484 340/435 |
| 2009/0195414 A1* | 8/2009 | Riegel | B62D 15/0295 340/995.19 |
| 2010/0094541 A1* | 4/2010 | Gresser | B60Q 1/50 701/533 |
| 2010/0253540 A1* | 10/2010 | Seder | B60R 1/00 340/905 |
| 2011/0055133 A1* | 3/2011 | Gee | A61B 5/0015 706/46 |
| 2011/0301813 A1* | 12/2011 | Sun | B62D 15/029 701/41 |
| 2012/0050489 A1 | 3/2012 | Gupta et al. | |
| 2012/0158243 A1* | 6/2012 | Pupin | B62D 15/0295 701/36 |
| 2012/0215439 A1 | 8/2012 | Chen | |
| 2012/0224060 A1* | 9/2012 | Gurevich | B60R 1/00 348/148 |
| 2012/0249589 A1* | 10/2012 | Gassner | G02B 27/01 345/633 |
| 2013/0002871 A1* | 1/2013 | Natroshvili | G06T 7/0018 348/148 |
| 2013/0035850 A1 | 2/2013 | He | |
| 2013/0054089 A1* | 2/2013 | Nordbruch | B60Q 1/085 701/36 |
| 2013/0110349 A1* | 5/2013 | Tseng | B60W 50/087 701/36 |
| 2014/0063824 A1* | 3/2014 | Guan | B60Q 9/008 362/464 |
| 2014/0172189 A1* | 6/2014 | Engel | G01C 21/28 701/1 |
| 2014/0267415 A1* | 9/2014 | Tang | G06T 11/60 345/633 |
| 2015/0224926 A1* | 8/2015 | Mochizuki | B60R 1/00 701/36 |
| 2015/0331236 A1* | 11/2015 | Roth | B60K 37/00 348/48 |
| 2015/0353095 A1* | 12/2015 | Freess | B60C 9/00 701/41 |

FOREIGN PATENT DOCUMENTS

| | | | | |
|---|---|---|---|---|
| DE | 20 2013 006 071 U1 | 11/2013 | | |
| EP | 1 916 153 A2 | 4/2008 | | |
| JP | 2004299651 A | * | 10/2004 | |
| JP | 2010026759 A | * | 2/2010 | |
| WO | WO 2004/092876 A2 | 10/2004 | | |
| WO | WO-2006037402 A1 | * | 4/2006 | ......... G01C 21/3602 |
| WO | WO 2007/039877 A2 | 4/2007 | | |
| WO | WO 2009/062458 A1 | 5/2009 | | |
| WO | WO 2009/124080 A1 | 10/2009 | | |
| WO | WO 2012/141827 A2 | 10/2012 | | |
| WO | WO 2013/113500 A1 | 8/2013 | | |
| WO | WO-2013113500 A1 | * | 8/2013 | |
| WO | WO-2013/188593 A1 | * | 12/2013 | |
| WO | WO 2014/095067 A1 | 6/2014 | | |

OTHER PUBLICATIONS

Magellan eXplorist XL Reference Manual, © 2005 Thales Navigation, Inc, 98 pages (Year: 2005).*

Mud Map HD Off Road Navigation app for iPad User Guide—Rev 1, Sep. 7, 2012, 10 pages (Year: 2012).*

Point of Beginning review, "The Earthmate GPS PN-20 by Delorme", Jan. 1, 2008, 6 pages (Year: 2008).*

Google, 2014, Google Maps, maps.google.co.uk, [online], available from https://maps.google.co.uk/maps?hl=en&tab=wl&output=classic &dq=brw , accessed Dec. 22, 2014, No publication date available.

Examination Report, GB Application No. 1405304.5, dated Jun. 3, 2016, 3 pages.

Examination Report, GB Application No. 1405303.7, dated Jun. 1, 2016, 2 pages.

Combined Search and Examination Report, GB Application No. 1405303.7, dated Dec. 23, 2014, 9 pages.

Combined Search and Examination Report, GB Application No. 1405304.5, dated Sep. 25, 2014, 9 pages.

Report, GB Application No. 1405303.7, dated Sep. 24, 2014, 3 pages.

Notification of Transmittal of the International Search Report and the Written Opinion of the International Searching Authority, or the Declaration, PCT/EP2015/056369, dated Jul. 1, 2015, 11 pages.

* cited by examiner

NAVIGATION SYSTEM

RELATED APPLICATIONS

This application is a 35 U.S.C. § 371 national stage application of PCT Application No. PCT/EP2015/056369, filed on Mar. 25, 2015, which claims priority from Great Britain Patent Application No. 1405304.5 filed on Mar. 25, 2014, and from Great Britain Patent Application No. 1405303.7 filed on Mar. 25, 2014, the contents of which are incorporated herein by reference in their entireties. The above-referenced PCT International Application was published in the English language as International Publication No. WO 2015/144751 A1 on Oct. 1, 2015.

TECHNICAL FIELD

The present disclosure relates to a navigation system and particularly, but not exclusively, to a navigation system and method which provide functionality to highlight the boundaries of a route to a user. Aspects of the invention relate to a system, to a method and to a vehicle.

BACKGROUND

Navigation systems, e.g. GPS based navigation devices, are becoming increasingly popular and provide users with a number of capabilities such as location services on a map, turn-by-turn navigation directions to a user in charge of a vehicle via text or speech or graphical interface and traffic services to reroute users around congestion.

Such navigation systems will commonly use global positioning system (GPS) signals to determine latitude and longitude information for the device's location on Earth. Such navigation systems may be able to provide route options between two points, alternative route options in the event of route congestion or route closures and the location of services on route (e.g. food, fuel etc.).

Navigation systems may take a number of forms such as a dedicated GPS navigation device, a mobile phone with GPS capability or a laptop computer with navigation software.

Users may plan routes using a navigation system either by entering a start and end point or by searching for a location to travel to and allowing the device to determine its current location as the start point. In many instances a user may be presented with multiple route options for their journey and may additionally have the ability to customise the route slightly by selecting different roads either via a direct interaction with the suggested route or by selecting or de-selecting journey options in a settings menu (e.g. a user may choose to avoid roads with tolls or avoid motorways).

Navigation systems however do not provide a user with complete freedom to select their preferred route. Additionally, where a user wishes to undertake a journey that is entirely or partially "off road" then a traditional navigation device will not be able to plot a route or may suggest a circuitous route via a road network when a more direct "off road" option is possible.

It is noted that for convenience reference is made within this document to GPS navigation systems. It is to be acknowledged however that alternative location services may be used, e.g. the GLONASS, Beidou (or Compass) or Galileo satellite navigation systems.

Once a route has been selected the navigation system outputs navigation directions to the user to reach their destination.

In certain circumstances however it may be difficult to follow the navigation directions because the boundary of the selected route is not clear to the user, e.g. because of adverse weather conditions (snow on route, flooding, landslip, thick fog, heavy rain etc.).

The present invention has been devised to mitigate or overcome the above mentioned problems with following route directions.

SUMMARY OF THE INVENTION

According to a first aspect of the present invention there is provided a navigation system for providing navigation directions to a user comprising: an input for receiving user commands to define a navigation route; processing means arranged to determine navigation directions relating to the user selected route; and an output arranged to output navigation directions to the user wherein the processing means is arranged to determine the boundary of the navigation route and the output is arranged to output an indication signal to mark the boundaries of the navigation route.

The indication signal may be arranged to be sent to a projection system for projecting lane markers on the ground/external to the navigation system (or in the case of a vehicle example, external to the vehicle).

The indication signal may be arranged to be sent to a head-up display to indicate the boundaries of the navigation route to the user.

The indication signal may comprise one or more of the following route features: bends, corners, junctions, width restrictions.

The processing means may determine the width of the navigation route by analysing aerial or satellite imagery.

The processing means may determine the width of the navigation route by looking up boundary information in a look up table.

The processing means may be arranged to determine whether the boundaries of the navigation route are obscured. In order to determine whether a route is obscured, the processing means may be arranged to analyse aerial or satellite imagery to determine whether the route is obscured. Alternatively, the processing means may be arranged to determine a likelihood that the route has been obscured based on a driving mode of a traction control system (e.g. if a snow driving mode has been engaged then the processing means may determine that there is a chance the route has been obscured).

The processing means may be arranged to determine whether the route has been obscure based on an external communication, e.g. a weather report.

The invention extends to a navigation arrangement comprising a navigation system according to the first aspect of the invention and a route boundary display means for displaying the boundary of the navigation route. The navigation arrangement may further comprise user control means for allowing a user to switch the route boundary display ON or OFF.

The invention extends to a vehicle comprising a navigation system according to the first aspect of the invention or a navigation arrangement incorporating a navigation system according to the first aspect of the invention. The navigation system or navigation arrangement may be integrated into the vehicle. The navigation system may comprise a mobile communications device in communication with the vehicle.

According to a further aspect of the present invention there is provided a method for providing navigation directions to a user comprising: determining navigation directions relating to a user selected route, and outputting navigation directions to the user, wherein determining navigation directions comprises determining the boundary of the navigation route and outputting navigation directions comprises outputting an indication signal to mark the boundaries of the navigation.

The invention extends to a computer program product comprising computer readable code for controlling a computing device to carry out the method of the aspect of the invention as described in the paragraph above.

According to another aspect of the present invention there is provided a navigation system for providing navigation directions to a user comprising: an input for receiving a map image; display means for displaying the map image to the user; processing means arranged to locate the navigation system on the received map image and to allow the user to define a user selected route; and an output arranged to output navigation directions to the user wherein the processing means is arranged to allow the user to superpose a route onto the map image.

The processing means may be arranged to allow the user to superpose a free form route onto the map image. The user may superpose the free form route onto the map image by placing one or more of: a start point; an end point and; a plurality of waypoints to define a route there-between. The system may then interpolate between the waypoints, optionally using a smoothing algorithm, to define a continuous route.

The processing means may be arranged to allow the user to trace a route onto the map image. The route may be traced in the form of a substantially continuous line or curve from a starting point to an end point.

The display means may be a touch-enabled device and the processing means may be arranged to process a route defined by the user by touching the display means.

The navigation system may further comprise an input for receiving user commands. The input may be a touch-sensitive input device.

The map image may comprise an area without a road network. For example, the navigation system may allow a user to define an "off-road" route. It is noted that the map image may also comprise a mixture of road network and off-road areas.

The processing means may be arranged to allow the user to define a user selected route within the area without a road network.

The processing means may be arranged to locate itself within the context of the area shown in the map image and to display this location to the user on the display means. The received map image may comprise location meta-data and the processing means may be arranged to compare the location meta-data to the location of the navigation system. The navigation system may further comprise a position estimation module arranged to estimate the position of the navigation system within the received map image. The position estimation module may comprise a simultaneous localisation and mapping module.

The navigation system may comprise an input for receiving sensor data for estimating the position of the navigation system within the received map image. The input may be arranged to receive one or more of the following sensor data types: visual data from image sensors; inertial navigation system data; global positioning system data; wheel speed sensor data.

The position estimation module may be arranged to update the accuracy of the position of the navigation system within the received map image with sensor data received as the navigation system traverses the user selected route.

The processing means may be arranged to display terrain information along the user selected route. The terrain information may be displayed by colour coding the route in dependence upon the general traversability of the route, e.g. obstacles along the route may be highlighted.

The terrain information may be received from a terrain information system.

The navigation system may further comprise a trajectory guidance module arranged to determine navigation directions for the user selected route. The outputs may be arranged to output navigation directions to the display device. The outputs may be arranged to output navigation directions to a head-up display device.

The map image may comprise a photographic aerial image of the Earth.

The invention extends to a vehicle navigation system comprising a navigation system according to the aspect of the invention as described in the paragraphs above. The navigation system may be integrated into the vehicle. Alternatively, the navigation system may comprise a mobile communications device in communication with the vehicle.

The navigation system may be arranged to receive sensor data from vehicle sensors in order to determine vehicle location within a received map image. The vehicle navigation system may comprise a route data store arranged to store the route traversed by the vehicle. The vehicle navigation system may comprise uploading means for uploading the stored route to a server.

According to yet another aspect of the present invention there is provided a method for providing navigation directions to a user via a navigation system comprising: receiving a map image; displaying the map image to the user; locating the navigation system on the received map image and allowing the user to define a user selected route; outputting navigation directions to the user wherein method comprises allowing the user to superpose a route onto the map image.

The map image may comprise a photographic aerial image of the Earth.

The invention extends to a computer program product comprising computer readable code for controlling a computing device to carry out the method of the aspect of the invention as described in the paragraphs above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
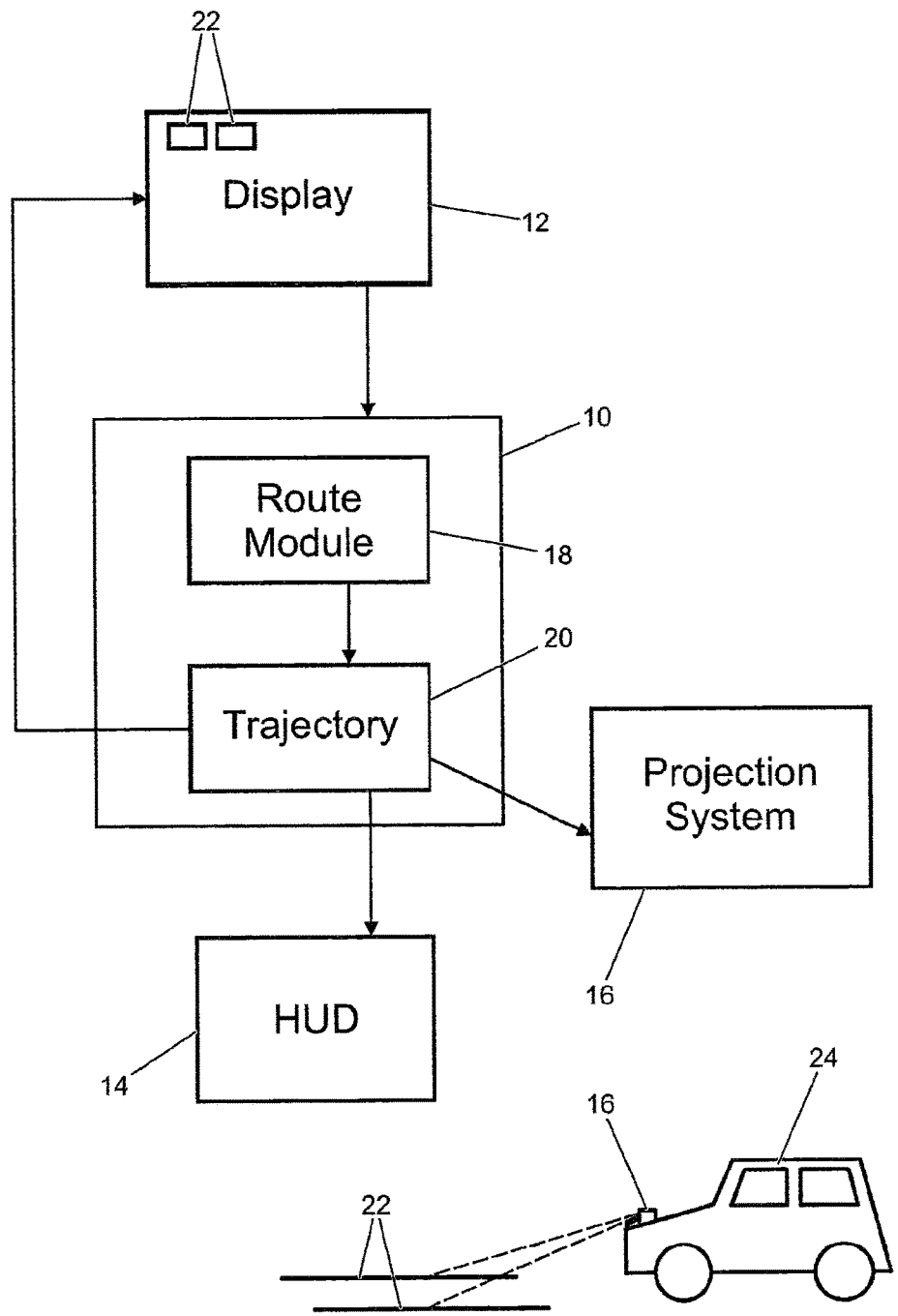
FIG. 1 is a schematic of a navigation system in accordance with an embodiment of the present invention.
Figure 4:
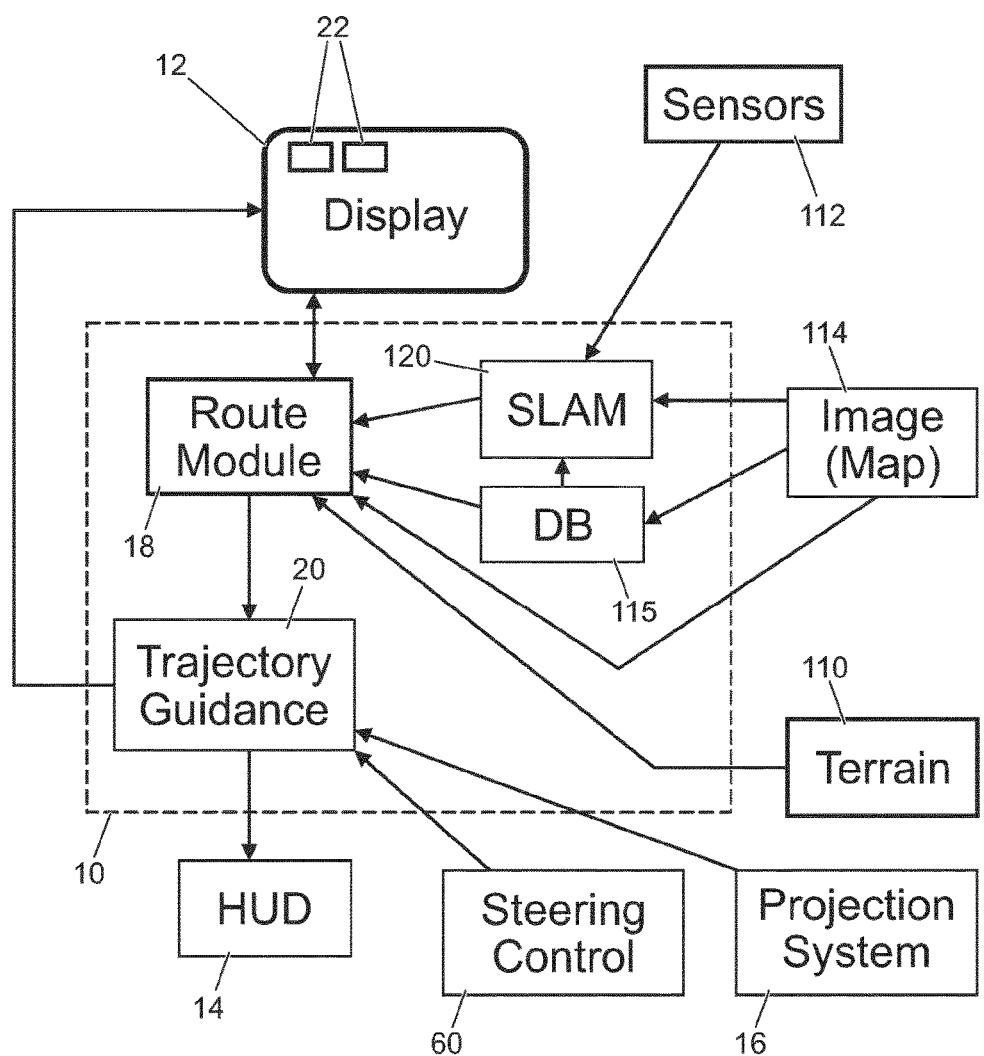
FIG. 4 is a schematic of a navigation system in accordance with a further embodiment of the present invention.

FIGS. 1 and 4 show navigation systems in accordance with embodiments of the present invention.

The navigation system 10 shown in FIG. 1 is in communication with a display device 12, a head-up display 14 and a projection system 16.

In the example of a vehicle navigation system, the display device 12 may either comprise a stand-alone display device (e.g. a tablet computing device such as an iPad®) or may be integrated into the vehicle (e.g. a dashboard mounted screen). The navigation system may also comprise a stand-alone system (for example it may comprise a software application running on the tablet device) or may be integrated into the vehicle.

The navigation system 10 further comprises a route module 18 which may define a route between points based on a user's input and a trajectory guidance module 20 which may determine driving/routing directions based on the route selected.

The route module 18 may be in communication with a user input device. In the example shown in FIG. 1 user input is via a touch-screen enabled display screen 12 and/or via physical user controls 22. It is noted however that other user input devices may be used e.g. keyboard, mouse, trackball inputs.

Planning the directions (trajectory) that the navigation system needs to take once the route has been set by the user is handled by the trajectory guidance system 20, the output of which may be supplied on one or more of the display screen 12, a head-up display 14 or a projection system 16.

The navigation system 10 may determine, as part of the route generation and trajectory guidance generation processes, the boundary of the route that has been generated. For example, where the route comprises a route via a road network then the navigation system may determine (e.g. via GPS location and a suitable look up table) the width (boundaries) of the route along the path selected by the user.

The boundaries of the route may then be displayed to the user. The route boundaries may be displayed via a head-up display 14 or via a suitable projection system 16 such as an LED or laser projection system which projects the boundary 22 of the route outside the vehicle 24 onto the ground (in effect it would project "lane markers" 22 or a "virtual lane").

Where the route selected by the user comprises off road elements then the navigation system 10 may analyse satellite imagery to determine the width of any off-road tracks included within the selected path.

Regardless of the mechanism for displaying the boundary of the selected route to the user it is noted that the "virtual lanes" may be displayed so as to show road features such as bends, corners, junctions, route width restrictions etc.

The navigation system 10 may be arranged to determine whether the route is obscured such that the virtual lanes need to be displayed to the user and may be further arranged to output the boundary 22 of the route to the user in the event that such a determination has been made. The navigation system 10 may be arranged to analyse image data received from image sensors (e.g. cameras) to determine if the route has been obscured. Alternatively, in the event that the navigation system is in communication with a vehicle traction control system the navigation system may determine that the route is obscured if the traction control system has entered certain driving modes (e.g. a snow mode may indicate that the route is likely to be obscured).

Alternatively or additionally the user of the navigation system may be provided with a user command option to switch the route boundary display "on" or "off".

Figure 2:
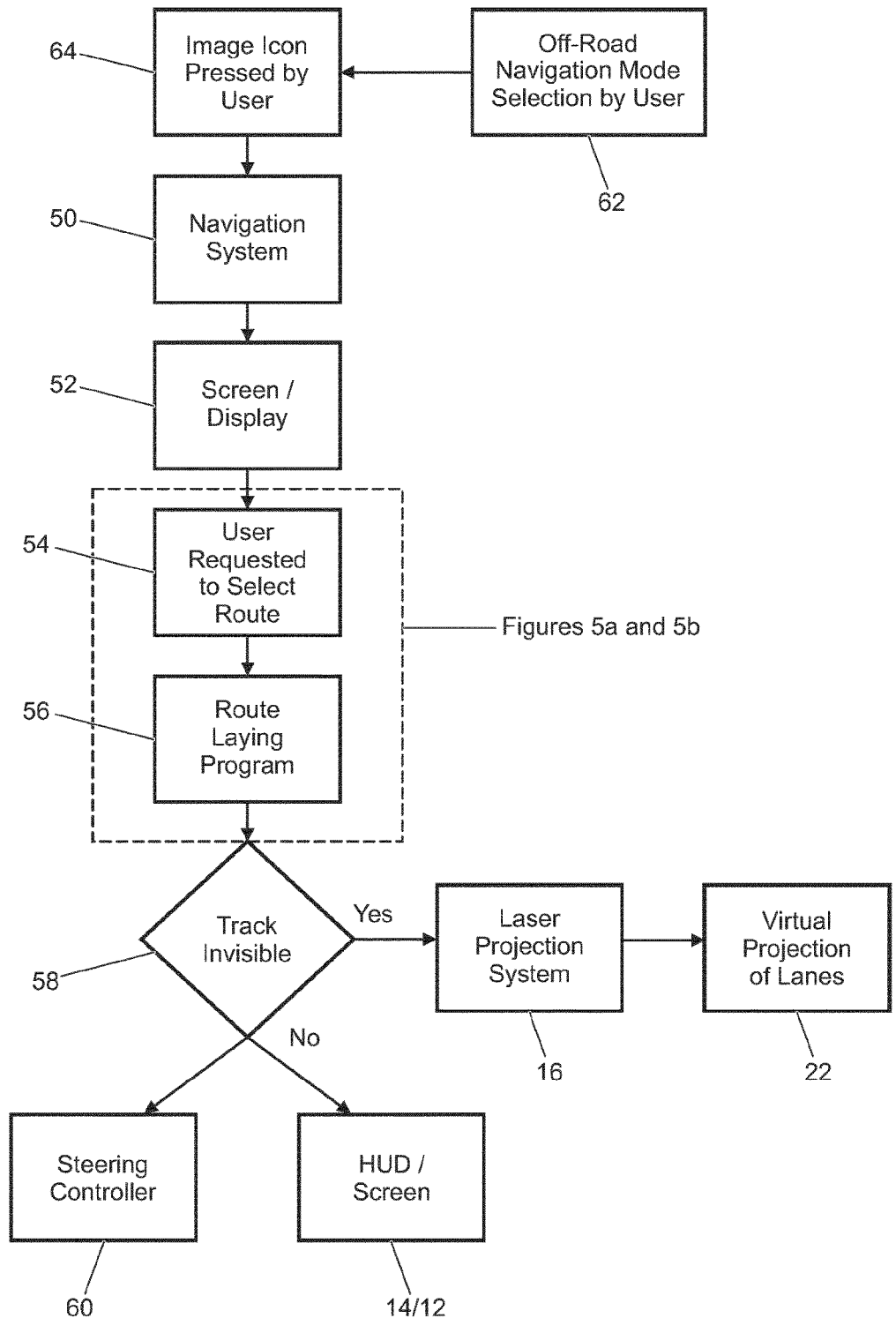
FIG. 2 is a flow chart of a method of using the navigation system of FIG. 1.

FIG. 2 illustrates a method according to an embodiment of the present invention for displaying route boundaries 22 to a user. FIG. 2 is described below with reference to the relevant features of FIG. 1.

In a first example a user may activate, at 50, their navigation system 10. A set of menu options may then be displayed, at 52, to the user via the display screen 12 of the navigation system 10. The user may then request, at 54, a route to a destination from the navigation system which plots, at 56, the route using a route laying program. It is noted that the requesting the route and plotting route steps 54, 56 are described in more detail with respect to FIGS. 5a and 5b below for a particular example where the user is plotting an "off-road" route.

Once the route has been plotted the user may determine, at 58, whether the route is visible or not. Alternatively, the navigation system may make a determination, at 58, about the visibility of the route. If the route is visible then navigation directions may be presented to the user of the navigation system either via the display device 12 of the navigation system or, in the event that the system is for example being used in a vehicle, via a head-up display (HUD) 14. The navigation directions may also be sent to a steering controller 60 for autonomous vehicles.

If the route is invisible however (e.g. obscured from the user's view in the environment) then the navigation system 10 may determine the boundary 22 of the route and may send this information to a laser projection system 16 which then projects virtual lanes on the ground outside the vehicle 24 for the user to see. In an alternative embodiment the boundary information may be supplied to the user via a HUD display 14.

The above provision of "virtual lanes" to the user is applicable in both on-road and off-road scenarios. In the event that the user wishes to plot an off-road route then they may select an off-road navigation mode 62 and then select a map image icon 64 in order to initiate a route planning mode for off-road use.

The off-road option is described in more detail with reference to FIGS. 3a, 3b, 4, 5a and 5b below.

Figure 3A:
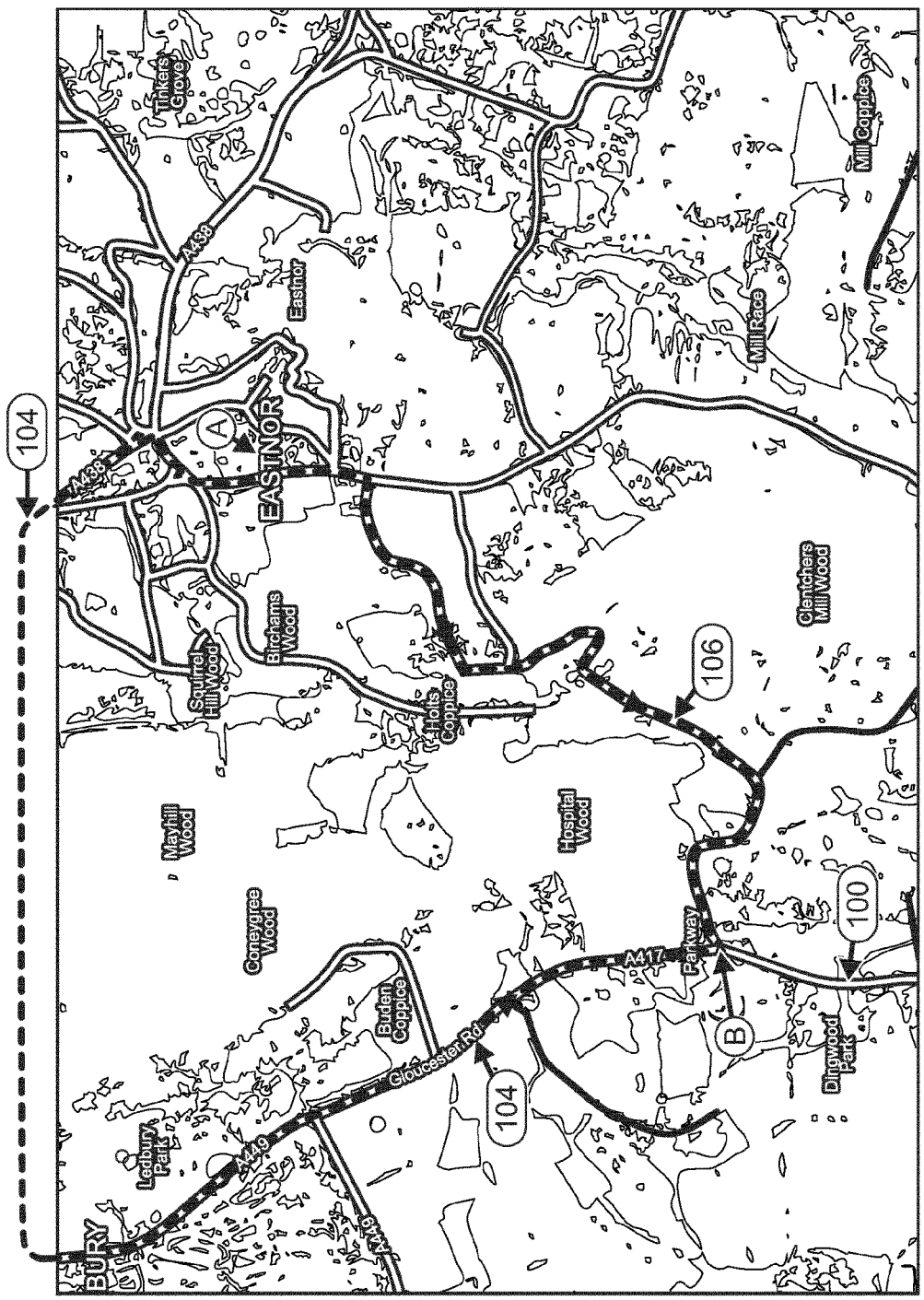
FIGS. 3a and 3b are respectively a map image (photograph) of an area of land comprising a number of roads in a road network and an off road area and the corresponding map view of the same area of land.
Figure 3B:
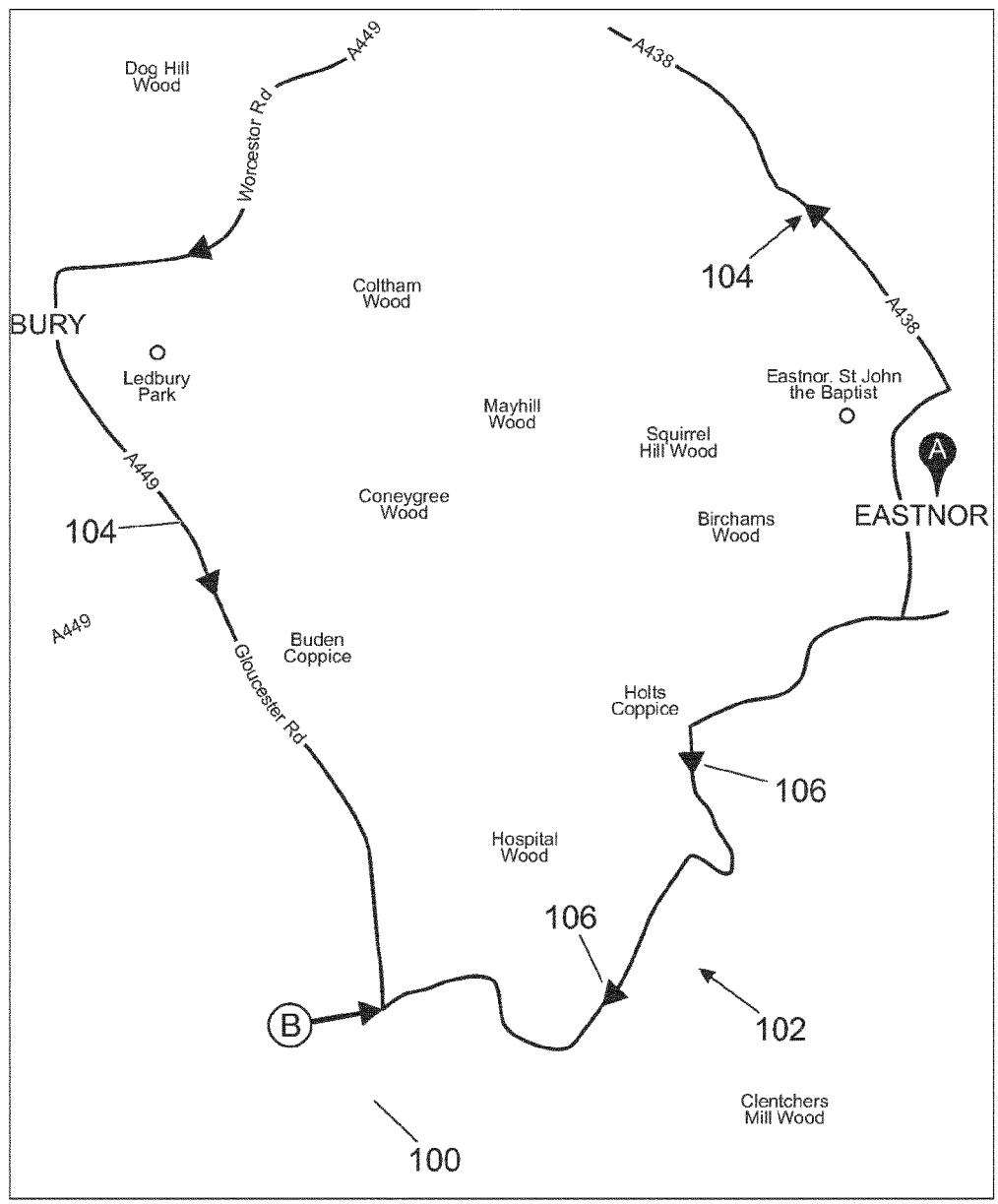

FIG. 3a shows an aerial image of an area of land and FIG. 3b shows substantially the same area of land in "map view" or "map mode". The land comprises a number of roads 100 within a road network and an "off road" area 102 comprising a number of un-tarmacked tracks.

A known navigation system 10 tasked with planning a route between points A and B would return a route using the road network, e.g. path 104 (via roads A438/449/417 as shown in FIG. 3b). However, it is noted that for vehicles capable of traversing un-tarmacked tracks and/or open ground a more direct route may be represented by path 106.

The present invention provides a user with the functionality to define a route such as path 106 using the map image of FIG. 3a. It is noted that such functionality may be used where there is no road network, e.g. in rural locations or more exotic locations such as jungle, desert or snowfield. It is also noted that the invention would allow a user to define an alternative route in the event of road slippage or other obstruction in the event of an extreme weather event such as storms and flooding.

FIG. 4 shows a navigation system in accordance with an embodiment of the present invention. The navigation system 10 shown in FIG. 4 is in communication with a display device 12, a head-up display 14, a steering control system 60, a terrain information system 110, a number of sensors 112 (which may, in the example of a vehicle navigation system, be either on-board sensors, sensors that are not part of the vehicle or a mixture of the two) and a projection system 16.

In the example of a vehicle navigation system, the display device 12 may either comprise a stand-alone display device (e.g. a tablet computing device such as an iPad®) or may be integrated into the vehicle (e.g. a dashboard mounted screen). The navigation system 10 may also comprise a stand-alone system (for example it may comprise a software application running on the tablet device) or may be integrated into the vehicle.

For clarity only one sensor input 112 is shown in FIG. 4. However, it is to be appreciated that the navigation system 10 may receive input signals from a plurality of sensors such as visual sensors (e.g. vehicle mounted cameras), radar-based sensors, gyroscopic sensors (to determine pitch, roll and yaw), inertial sensors e.g. accelerometers (to determine linear, longitudinal and lateral vehicle acceleration, velocity and distance/displacement) and a GPS antenna.

The navigation system 10 further comprises a route module 18 which may define a route between points based on a user's input and a trajectory guidance module 20 which may determine driving/routing directions based on the route selected.

The route module 18 may be in communication with a user input device 22. In the example shown in FIG. 4 user input is via a touch-screen enabled display screen 12 and/or via physical user controls 22. It is noted however that other user input devices may be used e.g. keyboard, mouse, trackball inputs.

As described in relation to FIGS. 5a and 5b below the navigation system 10 in accordance with embodiments of the present invention enables a user to trace a route on a displayed image 114 (e.g. an aerial map image) in order to plan a journey. The navigation system 10 is therefore additionally in communication with a map image data store. The map image data store is located remotely from the navigation system.

Map images may be fed directly into the route module 18 (e.g. if the supplied may images are accompanied by latitude/longitude location meta-data thereby enabling the route module to locate the system with respect to the supplied map image using, for example, GPS location data derived from the GPS antenna).

Alternatively, where a data connection between the navigation system 10 and the map image data store is temporary, map images covering a preselected area of the Earth may be downloaded to a data store (labelled "115" in FIG. 4) within or associated with the navigation system.

If map images supplied to the image data store 115 comprise latitude/longitude location meta data then they may be supplied directly to the route module 18.

If map images that are either supplied to the image data store 115 or are served directly for use in the route module 18 do not comprise latitude/longitude location meta-data then such map images may be routed through a simultaneous localisation and mapping (SLAM) module 120.

SLAM is a known technique used by autonomous vehicles to build a map within an unknown environment. In the present invention the SLAM module 120 operates to estimate the navigation system's position within the supplied map image 114 using available sensor information. In the example where the navigation system 10 is within or associated with a vehicle then the SLAM module may take advantage of existing vehicle sensors in order to estimate the vehicle's position within the supplied map image. Sensor data may be derived from on-board camera, radar units.

Map images that either have been supplied with location meta-data or have had such data estimated using the SLAM module can then be used by the route module 18.

Planning the directions (trajectory) that the navigation system 10 needs to take once the route has been set by the user is handled by the trajectory guidance system 20, the output of which may be supplied on one or more of the display screen 12, a head-up display 14, a steering control system 60 or a projection system 16.

Figure 5A:
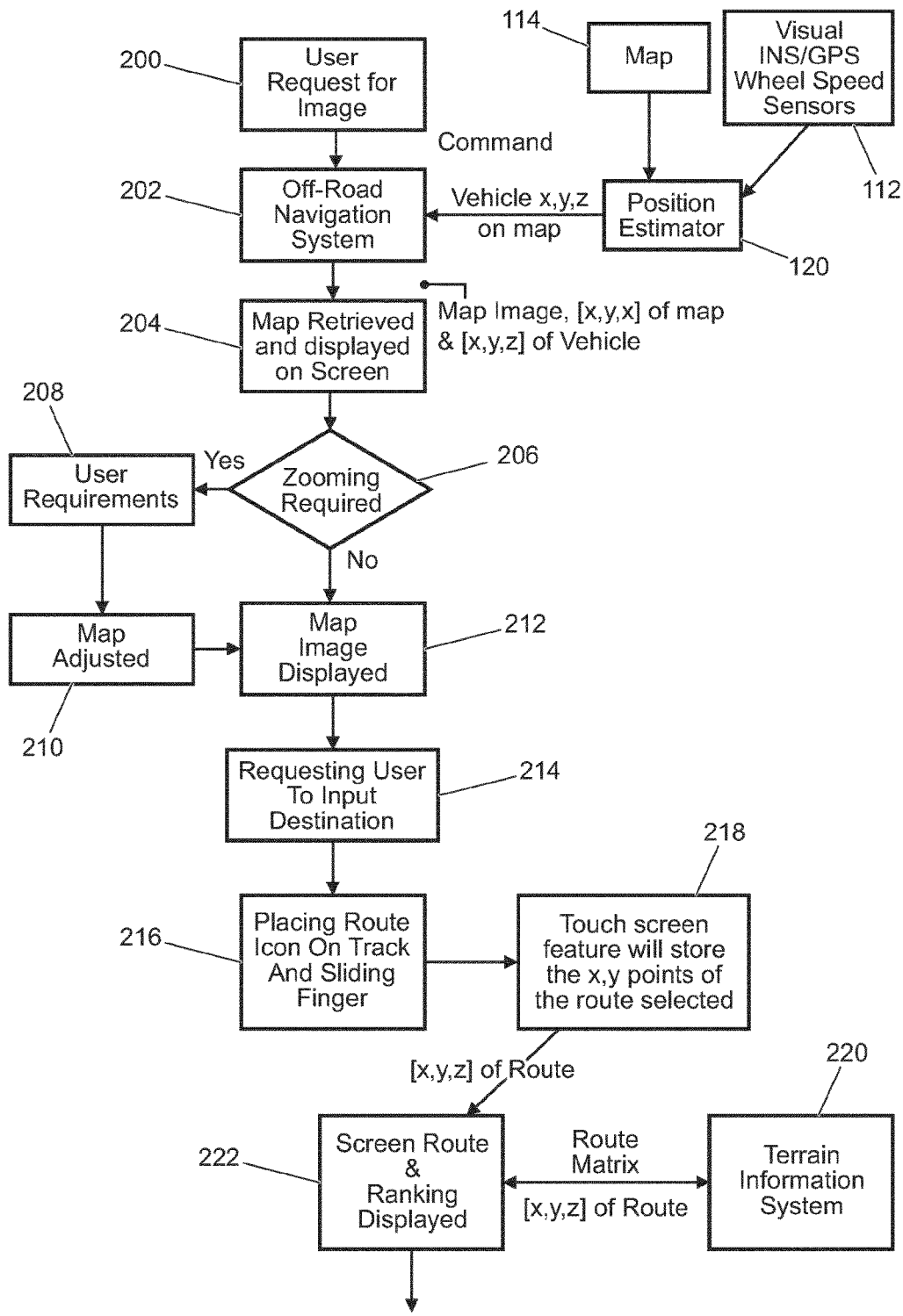
FIG. 5a is flow chart of a method of using the navigation system of FIG. 4 in accordance with the further embodiment of the present invention.
Figure 5B:
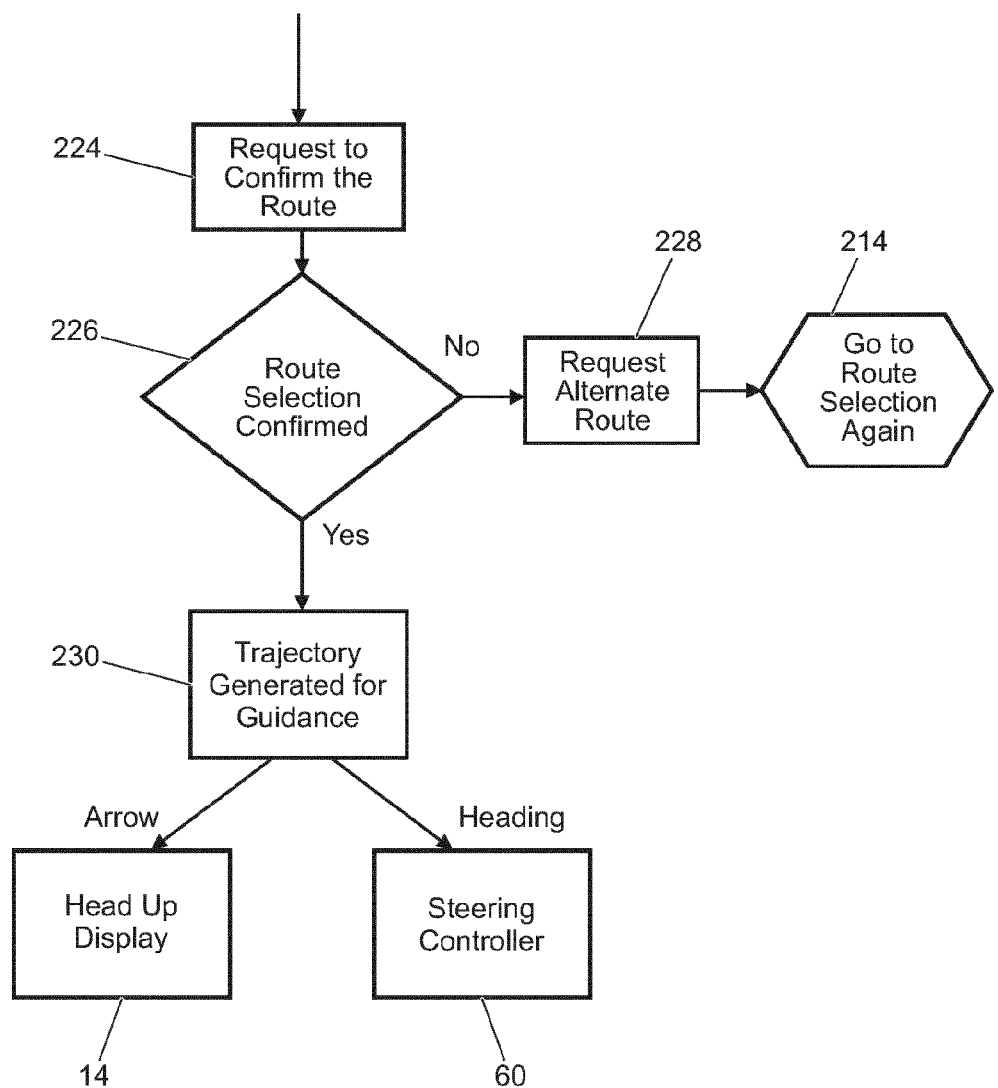
FIG. 5b is a flow chart of a method of using a navigation system of FIG. 4 in accordance with the further embodiment of the present invention.

The method according to the present invention is now described in relation to FIGS. 5a and 5b.

In FIG. 5a, a user of the navigation system 10 initially requests, 200, a map image (i.e. a photographic image) in order to plan a route. The request may be made via, for example a touch screen input on the display device 12.

In response to the user command the navigation system 10 locates itself, 202, on the map image. The map image may be supplied from an image source, e.g. Google or other mapping services, that incorporates location metadata. In such an event then the navigation system may conveniently be able to look up the GPS map image coordinates that correspond to the GPS lock that it has itself determined.

In the event that the map image has been supplied from an image source that does not include location metadata then the map image may be passed to a position estimator module which then estimates the location based on data received from a number of sensors. The position estimator module may comprise a SLAM module.

Once the position estimator module has estimated the navigation system's location this is supplied along with the map image to the routing module within the system and is then displayed, 204, on the display screen.

In the event that the route is obscured, e.g. because of snow on the ground or flooding, then the navigation system 10 may additionally determine the boundary 22 of the route from the map images 114 and display these to the user either via the HUD 14 or via the projection system 16.

It is noted that the location estimation process may use six degrees of freedom state estimation using any one or more of the following: GPS/INS (Inertial navigation system)/wheel speed sensors; mobile communication signals; visual data from image sensors; radar data for feature localisation.

The user may then adjust the size of the map image being displayed by a known "pinch and zoom" method or by double tapping the touchscreen of the display screen (see steps "Zooming required?" 206, "user requirements" 208 where the user interacts with the image, "map adjustment" 210 where the routing module/navigation system alters the display of the map image and "Map/image displayed" 212 where the user demanded map image is displayed on the display screen).

The user may then be prompted, 214, to input route information onto the map image. This may be accomplished, 216, by the user placing start/end icons on the map image and then tracing a route to be followed, e.g. by sliding their finger over map image as displayed on the display screen 12.

As the user interacts with the touchscreen the x, y positions of the user selected track will be stored, 218, such that the completed route can then be displayed.

Optionally the navigation system 10 may interact with a terrain information system 220 (this could be a standalone system or an integrated module within the navigation system). The terrain information system 220 may be able to provide, 222, terrain details relevant to the user selected route. For example, elevation (z) data may be incorporated into the selected route and the user warned of potentially difficult terrain within the selected route track.

Route quality may be indicated by red, yellow and green colours. High risk routes may be shaded red and any private property or international/state boundaries may also be indicated. Once the complete route has been displayed on the display screen (and any available terrain information system incorporated) the user may be prompted to confirm, 224, the route selection (see FIG. 5*b*).

In the event the user rejects the route then the system may prompt the user, in 228, to select an alternate route and the system may cycle round to the start of the route selection process.

In the event that the user accepts the route then the system may output the route to the trajectory guidance module 20 to generate, in 230, routing directions for the user. These may be output to the display device 12, to a head-up display 14 (e.g. in a vehicle or via wearable technology such as Google® Glasses), a projection system 16, and may be output to an autonomous steering controller system 60.

It is noted that where the position estimator module, 120, has estimated the location of the navigation system 10 within the map image 114 then the route developed between the user and the route module 18 will be an initial route (and the directions generated by the trajectory guidance module will be initial directions). As the navigation system moves along the selected route however the location data relative to the initially supplied map image will be improved by further data received from the sensors and the route will become more accurate as it is traversed.

The route that is traversed may be recorded by the navigation system and then uploaded to a central server so that other users may take advantage of the route.

Within the present application the term "map image" is taken to mean photographic imagery of a region of the Earth, e.g. an aerial or satellite photograph.

The invention extends to the features described in the following numbered paragraphs:

1. A navigation system for providing navigation directions to a user comprising: an input for receiving user commands to define a navigation route; a processor arranged to determine navigation directions relating to the user selected route; an output arranged to output navigation directions to the user wherein the processor is arranged to determine the boundary of the navigation route and the output is arranged to output an indication signal to mark the boundaries of the navigation route.

2. A navigation system as claimed in paragraph 1, wherein the indication signal is arranged to be sent to a projection system for projecting lane markers on the ground.

3. A navigation system as claimed in paragraph 1, wherein the indication signal is arranged to be sent to a head-up display to indicate the boundaries of the navigation route to the use.

4. A navigation system as claimed in paragraph 1, wherein the indication signal comprises one or more of the following route features: bends, corners, junctions, width restrictions.

5. A navigation system as claimed in paragraph 1, wherein the processor determines the width of the navigation route by analysing aerial or satellite imagery.

6. A navigation system as claimed in paragraph 1, wherein the processor determines the width of the navigation route by looking up boundary information in a look up table.

7. A navigation system as claimed in paragraph 1, wherein the processor is arranged to determine whether the boundaries of the navigation route are obscured.

8. A navigation system as claimed in paragraph 7, wherein the processor is arranged to analyse aerial or satellite imagery to determine whether the route is obscured.

9. A navigation system as claimed in paragraph 7, wherein the processor is arranged to determine whether the route has been obscured based on a driving mode of a traction control system.

10. A navigation system as claimed in paragraph 7, wherein the processor is arranged to determine whether the route has been obscure based on an external communication.

11. A navigation arrangement comprising a navigation system as claimed in paragraph 1 and a route boundary display for displaying the boundary of the navigation route.

12. A navigation arrangement as claimed in paragraph 11, further comprising user control means for allowing a user to switch the route boundary display ON or OFF.

13. A vehicle comprising a navigation system according to paragraph 1 or a navigation arrangement according to paragraph 11.

14. A vehicle as claimed in paragraph 13, wherein the navigation system or navigation arrangement is integrated into the vehicle.

15. A vehicle as claimed in paragraph 13, wherein the navigation system comprises a mobile communications device in communication with the vehicle.

16. A method for providing navigation directions to a user comprising: receiving user commands to define a navigation route; determining navigation directions relating to the user selected route; outputting navigation directions to the user wherein determining navigation directions comprises determining the boundary of the navigation route and outputting navigation directions comprises outputting an indication signal to mark the boundaries of the navigation.

17. A non-transitory computer readable medium storing a program for controlling a computing device to carry out the method of paragraph 16.

The invention claimed is:

1. A navigation system for providing navigation directions to a user of an off-road vehicle, the system comprising:
   a route module for receiving user commands to define a navigation route; and
   a trajectory guidance module arranged to determine, based on the user commands, navigation directions relating to the navigation route;
   wherein the navigation system is arranged to determine a width of an off-road track of the navigation route by analyzing aerial or satellite imagery and to output an indication signal to a light projection system for projecting lane markers on the ground to mark the width of the off-road track of the navigation route, and
   wherein the navigation system is arranged to determine whether the width of the off-road track of the navigation route is obscured based on a driving mode of a traction control system and to output the indication signal to the light projection system, in the event that the width of the off-road track is obscured.

2. The navigation system of claim 1, wherein the indication signal comprises one or more of the following route features: bends, corners, junctions, width restrictions.

3. The navigation system of claim 1, wherein the navigation system determines the width of the off-road track of the navigation route by looking up boundary information in a look up table.

4. The navigation system of claim 1, wherein the navigation system analyzes aerial or satellite imagery to determine whether the navigation route is obscured.

5. The navigation system of claim 1, wherein the navigation system determines whether the navigation route has been obscured based on an external communication.

6. The navigation system of claim 1, further comprising a route boundary display that displays the boundaries of the navigation route.

7. The navigation system of claim 6, further comprising a user control that allows the user to switch the route boundary display ON or OFF.

8. A vehicle comprising the navigation system of claim 1.

9. The vehicle of claim 8, wherein the navigation system is integrated into the vehicle.

10. The vehicle of claim 8, wherein the navigation system comprises a mobile communications device in communication with the vehicle.

11. A method for providing navigation directions to a user of an off-road vehicle, the method comprising:
receiving user commands to define a navigation route;
determining navigation directions relating to the navigation route based on the user commands;
determining a width of an off-road track of the navigation route by analyzing aerial or satellite imagery;
determining whether the width of the off-road track of the navigation route is obscured based on a driving mode of a traction control system; and
outputting, when the width of the off-road track is obscured, an indication signal to a light projection system for projecting lane markers on the ground to mark the width of the off-road track of the navigation route to the user.

12. A non-transitory computer-readable medium having computer-readable instructions thereon which, when executed by a computing device, cause the computing device to perform a method comprising:
receiving user commands to define a navigation route;
determining navigation directions relating to the navigation route based on the user commands;
determining a width of an off-road track of the navigation route by analyzing aerial or satellite imagery;
determining whether the width of the off-road track of the navigation route is obscured based on a driving mode of a traction control system; and
outputting, in the event that the width of the off-road track is obscured, an indication signal to a light projection system for projecting lane markers on the ground to mark the width of the off-road track of the navigation route to the user.

13. A navigation system for providing navigation directions to a user of an off-road vehicle, the system comprising:
a route module for receiving user commands to define a navigation route; and
a trajectory guidance module arranged to determine, based on the user commands, navigation directions relating to the navigation route;
wherein the navigation system is arranged to determine a width of an off-road track of the navigation route by analyzing aerial or satellite imagery and to output an indication signal to a head-up display for displaying lane markers to mark the width of the off-road track of the navigation route, and
wherein the navigation system is arranged to determine whether the width of the off-road track of the navigation route is obscured based on a driving mode of a traction control system and to output the indication signal to the head-up-display, in the event that the width of the off-road track is obscured.

* * * * *